United States Patent
Lee et al.

(10) Patent No.: US 11,938,817 B2
(45) Date of Patent: Mar. 26, 2024

(54) METHOD AND APPARATUS FOR CONTROLLING HEAD-UP DISPLAY BASED ON EYE TRACKING STATUS

(71) Applicant: SAMSUNG ELECTRONICS CO., LTD., Suwon-si (KR)

(72) Inventors: Huijin Lee, Pohang-si (KR); Junhwan Lee, Namyangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 17/216,082

(22) Filed: Mar. 29, 2021

(65) Prior Publication Data
US 2022/0055480 A1    Feb. 24, 2022

(30) Foreign Application Priority Data

Aug. 24, 2020 (KR) .......... 10-2020-0106554
Oct. 8, 2020 (KR) .......... 10-2020-0130402

(51) Int. Cl.
*B60K 35/00* (2006.01)
*G02B 27/00* (2006.01)
*G02B 27/01* (2006.01)

(52) U.S. Cl.
CPC .......... *B60K 35/00* (2013.01); *G02B 27/0093* (2013.01); *G02B 27/0179* (2013.01);
(Continued)

(58) Field of Classification Search
CPC ........... G02B 27/0093; G02B 27/01; G02B 27/0101; G02B 27/017; G02B 27/0172; G02B 27/0179; G02B 2027/0123; G02B 2027/0138; G02B 2027/0141; G02B 2027/0178; G02B 2027/0187; G06F 1/163; G06F 3/011; G06F 3/013; G06F 3/0304; G06T 7/246; G06T 7/277;
(Continued)

(56) References Cited

U.S. PATENT DOCUMENTS 8,704,879 B1 * 4/2014 Cheng ............... G06F 3/013
                                                        348/51
2014/0375541 A1 * 12/2014 Nister ............... A61B 3/113
                                                        345/156
(Continued)

FOREIGN PATENT DOCUMENTS

EP    3 037 922 A1    6/2016
EP    3 461 129 A1    3/2019
(Continued)

OTHER PUBLICATIONS

Communication dated Jan. 18, 2022 issued by the European Patent Office in European Application No. 21185831.1.
(Continued)

*Primary Examiner* — Nelson M Rosario
(74) *Attorney, Agent, or Firm* — Sughrue Mion, PLLC

(57) ABSTRACT

A method and apparatus for controlling a head-up display (HUD) considering an eye tracking status are provided. The method includes identifying an eye tracking status based on a result of an eye tracking, and identifying a rendering mode for an HUD image to be one of a two-dimensional (2D) rendering mode and a three-dimensional (3D) rendering mode based on the eye tracking status.

16 Claims, 16 Drawing Sheets

(52) U.S. Cl.
CPC .. *B60K 2370/1529* (2019.05); *B60K 2370/31* (2019.05); *B60K 2370/736* (2019.05); *B60K 2370/92* (2019.05); *G02B 2027/0181* (2013.01); *G02B 2027/0187* (2013.01)

(58) Field of Classification Search
CPC .......... G06T 2207/30196; G06T 2207/30201; G09G 2354/00; G09G 5/00
See application file for complete search history.

(56) References Cited

U.S. PATENT DOCUMENTS

| | | | |
|---|---|---|---|
| 2018/0144542 A1 | 5/2018 | Park et al. | |
| 2019/0037137 A1* | 1/2019 | Toksvig | H04N 21/816 |
| 2019/0096121 A1* | 3/2019 | Kang | G02B 27/0101 |
| 2019/0191149 A1* | 6/2019 | Lee | H04N 13/371 |
| 2019/0235624 A1 | 8/2019 | Goldberg et al. | |
| 2021/0300183 A1* | 9/2021 | Kondo | G02B 27/0101 |

FOREIGN PATENT DOCUMENTS

| | | |
|---|---|---|
| JP | 5092776 B2 | 12/2012 |
| KR | 10-2006-0130451 A | 12/2006 |
| KR | 10-2011-0011930 A | 2/2011 |
| KR | 10-2013-0012629 A | 2/2013 |
| KR | 10-2013-0089139 A | 8/2013 |
| KR | 10-1409846 B1 | 6/2014 |
| KR | 10-2015-0093353 A | 8/2015 |
| KR | 10-2016-0047205 A | 5/2016 |
| KR | 10-2016-0069451 A | 6/2016 |
| KR | 10-2017-0065738 A | 6/2017 |
| KR | 10-2017-0066749 A | 6/2017 |
| KR | 10-2018-0048049 A | 5/2018 |
| KR | 10-2018-0094830 A | 8/2018 |
| KR | 10-2020-0066826 A | 6/2020 |

OTHER PUBLICATIONS

Communication dated Sep. 21, 2023, issued by the European Patent Office in European Application No. 21185831.1.

* cited by examiner

METHOD AND APPARATUS FOR CONTROLLING HEAD-UP DISPLAY BASED ON EYE TRACKING STATUS

CROSS-REFERENCE TO RELATED APPLICATION

This application claims priority to Korean Patent Application No. 10-2020-0106554 filed on Aug. 24, 2020, and Korean Patent Application No. 10-2020-0130402 filed on Oct. 8, 2020, in the Korean Intellectual Property Office, the disclosures of which are incorporated by reference herein in their entirety.

BACKGROUND

1. Field

Methods and apparatuses consistent with example embodiments relate to a method and apparatus for controlling a head-up display (HUD) based on an eye tracking status.

2. Description of the Related Art

A head-up display (HUD) system generates a virtual image in front of a driver of a vehicle and provides a variety of information to the driver by displaying the information in the virtual image. The information provided to the driver may include, for example, navigation information and dashboard information such as a vehicle velocity, a fuel level, and an engine revolution per minute (RPM). The driver may more easily recognize the information displayed in front without turning his or her gaze during driving, and thus, driving safety may improve. In addition to the navigation information and the dashboard information, the HUD system may also provide the driver with, for example, a lane indicator, a construction indicator, an accident indicator, or a pedestrian detection indicator using augmented reality (AR), to assist with driving when a field of view is poor and/or inadequate.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of the disclosure, there is provided a method of controlling a head-up display (HUD), the method comprising: performing eye tracking of an eye of a user in a captured image; identifying an eye tracking status based on a result of the eye tracking; identifying a rendering mode for an HUD image to be one of a two-dimensional (2D) rendering mode and a three-dimensional (3D) rendering mode based on the eye tracking status; and rendering the HUD image in the identified rendering mode.

The identifying the eye tracking status may comprise classifying the eye tracking status as one of a stable status and an unstable status based on whether eye coordinates are present in the result of the eye tracking or based on a rate of change of the eye coordinates.

The identifying the rendering mode may comprise: identifying the rendering mode to be the 3D rendering mode based on the eye tracking status being classified as the stable status; and identifying the rendering mode to be the 2D rendering mode based on the eye tracking status being classified as the unstable status.

The eye tracking status may be classified as the stable status based on the eye coordinates being included in the result of the eye tracking and a speed of change of the eye coordinates is less than a reference value.

The reference value may correspond to a system processing rate.

The eye tracking status may be classified as the unstable status based on the eye coordinates being included in the result of the eye tracking and a speed of change of the eye coordinates is greater than a reference value, or based on the eye coordinates not being included in the result of the eye tracking.

The HUD image may be rendered based on a first source image for a first viewpoint and a second source image for a second viewpoint.

Based on the identified rendering mode being the 2D rendering, the rendering the HUD image mat comprise rendering the HUD image by setting the first viewpoint and the second viewpoint equally as a single viewpoint.

The rendering the HUD image may comprise: setting, based on the result of the eye tracking including current eye coordinates of both eyes and a speed of change of the current eye coordinates being greater than a reference value, the first viewpoint and the second viewpoint equally as a center viewpoint of the current eye coordinates; and setting, based on the result of the eye tracking not including the current eye coordinates, the first viewpoint and the second viewpoint equally as a center viewpoint of previous eye coordinates.

Based on the identified rendering mode being the 3D rendering mode, the rendering the HUD image may comprise rendering the HUD image by setting the first viewpoint and the second viewpoint as different viewpoints.

Based on the rendering mode being identified, the rendering mode may be switched from the 3D rendering mode to the 2D rendering mode or from the 2D rendering mode to the 3D rendering mode during a buffer time corresponding to a plurality of frames.

The HUD image may be rendered based on a first source image for a first viewpoint and a second source image for a second viewpoint, and wherein, based on the rendering mode being switched from the 2D rendering mode to the 3D rendering mode, the rendering the HUD image comprises rendering the HUD image while gradually changing the first viewpoint and the second viewpoint to a single viewpoint used in the 2D rendering mode over the buffer time.

According to another aspect of the disclosure, there is provided a non-transitory computer-readable storage medium storing instructions that, when executed by a processor, cause the processor to perform the method.

According to another aspect of the disclosure, there is provided an apparatus for controlling a head-up display (HUD), the apparatus comprising: a memory configured to store one or more instructions; and a processor configured to execute the one or more instructions to: perform eye tracking of an eye of a user in a captured image, identify an eye tracking status based on a result of the eye tracking, identify a rendering mode for an HUD image to be one of a two-dimensional (2D) rendering mode and a three-dimensional (3D) rendering mode based on the eye tracking status, and render the HUD image in the identified rendering mode.

The processor may be further configured to classify the eye tracking status as one of a stable status and an unstable status based on whether eye coordinates are present in the result of the eye tracking or based on a rate of change of the eye coordinates.

The processor may be further configured to: identify the rendering mode to be the 3D rendering mode based on the eye tracking status being classified as the stable status; and identify the rendering mode to be the 2D rendering mode based on the eye tracking status being classified as the unstable status.

Based on the rendering mode being identified, the rendering mode may be switched from the 3D rendering mode to the 2D rendering mode or from the 2D rendering mode to the 3D rendering mode during a buffer time corresponding to a plurality of frames.

According to another aspect of the disclosure, there is provided a head-up display (HUD) device comprising: an eye tracking camera configured to capture an image including a user; a processor configured to perform eye tracking on the captured image, identify an eye tracking status based on a result of the eye tracking, identify a rendering mode for an HUD image to be one of a two-dimensional (2D) rendering mode and a three-dimensional (3D) rendering mode based on the eye tracking status, and render the HUD image in the identified rendering mode; and a display device configured to provide the HUD image to the user using augmented reality (AR).

The processor may be further configured to classify the eye tracking status as one of a stable status and an unstable status based on whether eye coordinates are present in the result of the eye tracking and based on a rate of change of the eye coordinates.

The processor may be further configured to, based on the rendering mode being identified, switch the rendering mode from the 3D rendering mode to the 2D rendering mode or from the 2D rendering mode to the 3D rendering mode during a buffer time corresponding to a plurality of frames.

According to another aspect of the disclosure, there is provided a display apparatus comprising: a memory configured to store one or more instructions; and a processor configured to execute the one or more instructions to: receive eye tracking information on an eye of a user in a captured image; identify whether the eye tracking is stable or unstable based on the eye tracking information; output a virtual object in a two-dimensional (2D) image based on the eye tracking being unstable; and output the virtual object in a three-dimensional (3D) image based on the eye tracking being stable.

According to another aspect of the disclosure, there is provided a display method comprising: receiving eye tracking information on an eye of a user in an image; identifying whether the eye tracking is stable or unstable based on the eye tracking information; outputting a virtual object in a two-dimensional (2D) image based on the eye tracking being unstable; and outputting the virtual object in a three-dimensional (3D) image based on the eye tracking being stable.

BRIEF DESCRIPTION OF THE DRAWINGS

The above and/or other aspects will be more apparent by describing certain example embodiments with reference to the accompanying drawings, in which.

DETAILED DESCRIPTION

Figure 1A:
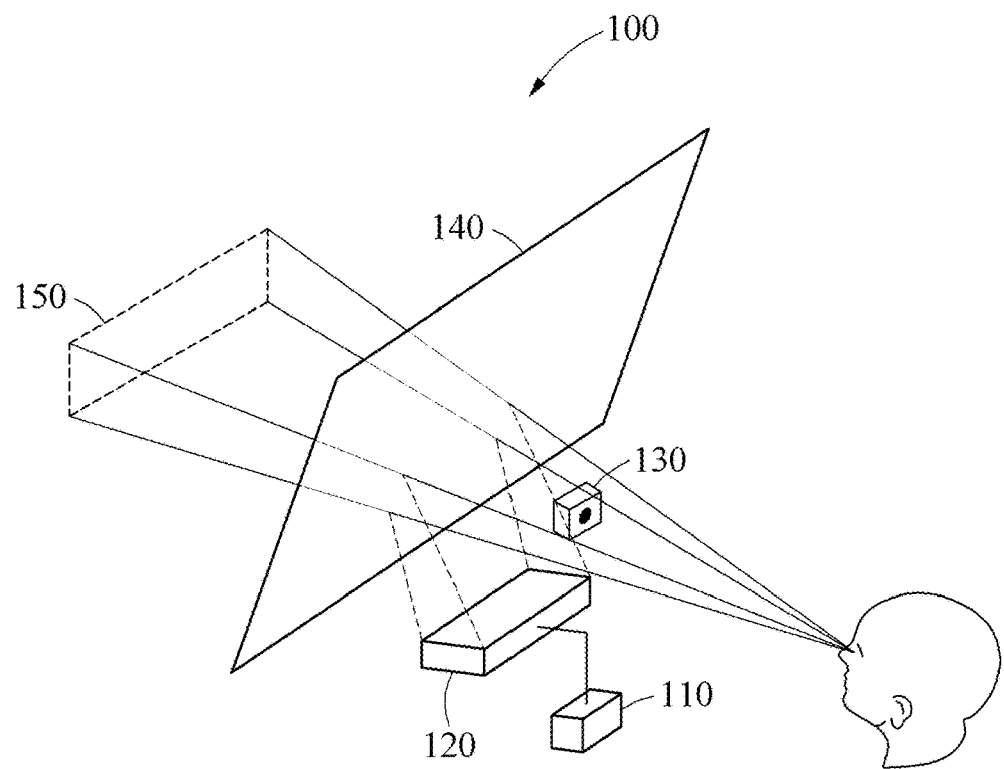
FIG. 1A illustrates a head-up display (HUD) device according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the disclosure.

Also, in the description of the components, terms such as first, second, A, B, (a), (b) or the like may be used herein when describing components of the disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1A illustrates a head-up display (HUD) device according to an example embodiment. Referring to FIG. 1A, an HUD device 100 includes an HUD control apparatus 110, a display device 120, an eye tracking camera 130, and a translucent optical device 140. The HUD device 100 may be mounted on a vehicle (for example, a car or an airplane) to provide an HUD image to a user (for example, a driver, a pilot, and the like). The HUD device 100 may provide the HUD image using augmented reality (AR). For example, contents provided through an AR HUD may include dashboard information, navigation information, a lane indicator, a construction indicator, an accident indicator, a pedestrian detection indicator, and the like. AR may be applied to an HUD, a transmissive head-mounted display (HMD), and the like. Hereinafter, an HUD will be described. However, the following description may also apply to an HMD or other display devices.

The display device 120 may include a light source, a display panel, a three-dimensional (3D) optical layer, and an optical element. The optical element may include a cata-dioptric system. Light corresponding to an HUD image may be provided by the display panel and the light source of the display device 120, and the cata-dioptric system may reflect the light corresponding to the HUD image toward the translucent optical device 140. In this case, the cata-dioptric system may refract the light corresponding to the HUD image to enlarge the HUD image. A light-emitting diode (LED) or a laser may be used as the light source.

A virtual screen 150 may be formed by the light corresponding to the HUD image output by the display device 120. A portion of the light output by the display device 120 may be reflected by the translucent optical device 140 positioned in front of the user and viewable by the user. The translucent optical device 140 may be a windshield of the car or airplane, or a combiner provided separately from the windshield for the purpose of reflecting an HUD image. The user views light passing through the front of the translucent optical device 140, and a portion of the light reflected by the translucent optical device 140 among the light radiated by the display device 120 at the same time. Thus, a real object and a virtual object may overlap each other and be provided to the user as AR content. For example, the real object may be an object in the surrounding environment visible through the translucent optical device 140.

The display device 120 may display the virtual object at a position corresponding to the real object. For example, traveling direction information of the vehicle, lane information, hazard information, and the like may be displayed through the HUD as virtual objects at positions corresponding to real objects. A position on the background or the surrounding environment at which a virtual object is to be displayed may be referred to as a target position. The HUD control apparatus 110 may display the virtual object at the target position using a transformation relationship between a coordinate system of the eye tracking camera 130 and a coordinate system of the virtual screen 150, 3D information on the background, and eye position information.

For example, the 3D information on the background may be obtained through a camera or a 3D sensor provided to face ahead of the vehicle. Eye positions of the user may be obtained through the eye tracking camera 130 provided to face the user. The eye tracking camera 130 may capture the user and generate a user image including the user (for example, the face of the user), and the HUD control apparatus 110 may obtain the eye positions by performing eye tracking on the user image. The HUD control apparatus 110 may generate the HUD image for displaying the virtual object at intersecting points where lines connecting the eye positions of the user and the target position intersect with the virtual screen 150, and the display device 120 may represent the virtual object at the target position by displaying the HUD image.

The display device 120 may provide a 3D image through the 3D optical layer. The HUD control apparatus 110 may generate a first source image (for example, a left image) for a first viewpoint (for example, the left eye) and a second source image (for example, a right image) for a second viewpoint (for example, the right eye), and render the HUD image based on the eye positions tracked by the eye tracking camera 130, the first source image and the second source image. Here, a viewpoint may correspond to a viewing position (for example, a position of an eye of a viewer). An operation of rendering the HUD image may include determining pixel values of the HUD image so that the first source image may be viewed at the first viewpoint and the second source image may be viewed at the second viewpoint. Hereinafter, an example of using two viewpoints for a 3D image will be described. However, embodiments of the disclosure are not limited to the description below, and as such, according to another example embodiment, two or more viewpoints may be used for a light field.

The display device 120 may display the HUD image generated as described above. The display device 120 may display the HUD image on the display panel. The HUD image may pass through the 3D optical layer and be provided to the user. In this case, different images corresponding to the first source image and the second source image may be provided to both eyes of the user. For each of the first source image and the second source image, the HUD control apparatus 110 may render the HUD image so that the virtual object may be displayed at the intersecting point where a line connecting each eye position of the user and the target position intersects with the virtual screen 150.

Figure 1B:
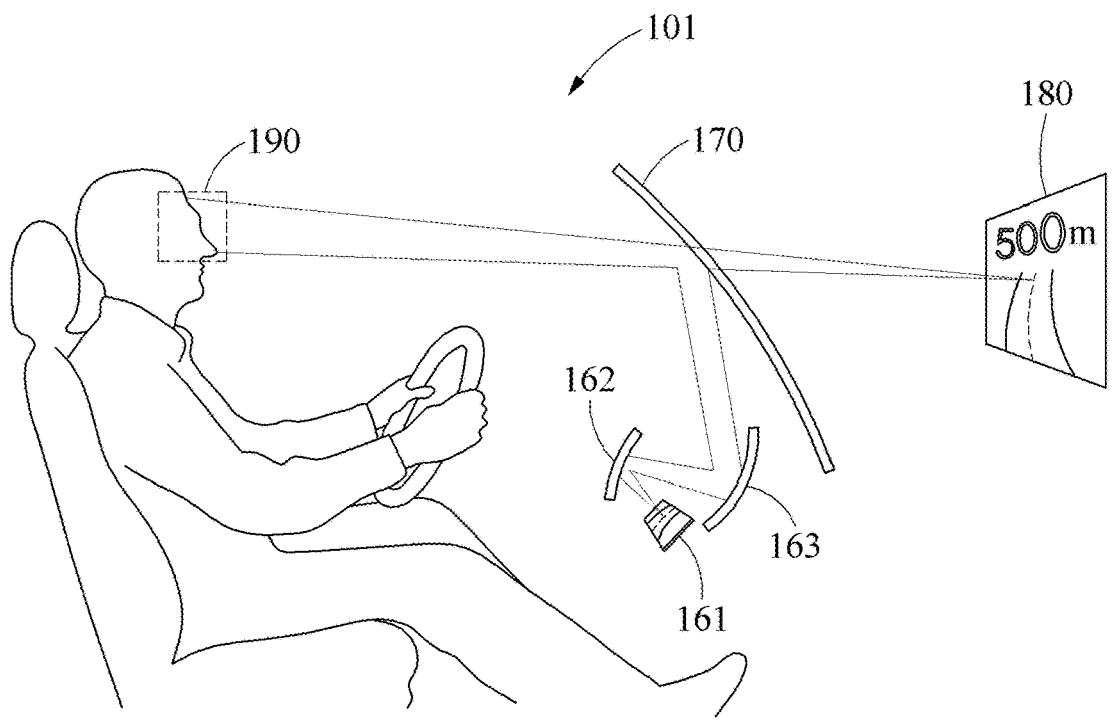
FIG. 1B illustrates a path of light in relation to an HUD device according to an example embodiment.

FIG. 1B illustrates a path of light in relation to an HUD device according to an example embodiment. Referring to FIG. 1B, an HUD device 101 includes a display device 161 and mirrors 162 and 163. The display device 161 may correspond to the display device 120 of FIG. 1A. The display device 161 may include a display panel and a light source and provide light corresponding to an HUD image through the display panel and the light source. For example, the light source may include a backlight unit (BLU).

Light corresponding to the HUD image output by the display device 161 may be reflected by the mirrors 162 and 163 and projected onto a windshield 170. At least one of the mirrors 162 and 163 may correspond to an aspheric surface mirror, and adjust a path of the light corresponding to the HUD image to enlarge the HUD image. A user may view a virtual image corresponding to the HUD image on a virtual screen 180 through light reflected by the windshield 170 toward an eye box 190.

In this way, the HUD system 100 may display information on the virtual screen 180 provided in front of the user through projection. In order to provide AR information through an HUD, the virtual screen 180 on which the HUD image is viewed may be implemented with a wide field of view (FOV). If the size of an image to be represented is not large enough or the FOV is not wide enough, it may be difficult to represent information on an object or background in front of a vehicle using AR.

The display device 161 and the mirrors 162 and 163 may be mounted in a dashboard of the vehicle. The display device 161 and the mirrors 162 and 163 may be designed to provide an FOV wide enough to implement AR. For example, the BLU of the display device 161 may optimize an output angle of the light output from the LED using a secondary lens array, and compensate for a shortfall in the output angle using a side reflector. In this case, the diffusion angles of a diffuser plate and a polarized diffuser plate may be maintained at small values, so that a decrease in the efficiency of the BLU may be prevented. Accordingly, it is possible to achieve compact BLU volume, wide FOV, uniformity, improved side brightness, and the like.

Figure 2:
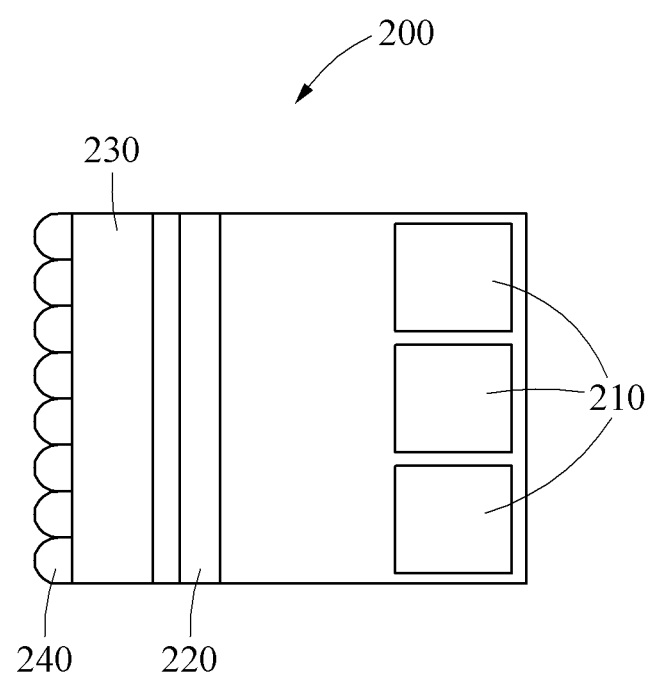
FIG. 2 illustrates a structure of a display device according to an example embodiment.

FIG. 2 illustrates a structure of a display device according to an example embodiment. Referring to FIG. 2, a display device 200 includes a light source 210, a diffuser 220, a display panel 230, and a 3D optical layer 240. The light source 210 may correspond to a BLU. According to an example embodiment, the light source may include a white LED, a red/green/blue (RGB) LED, or an RGB laser. If an aspheric mirror is used as an enlarging and reflecting mirror, any of the white LED, the RGB LED, and the RGB laser may be used. However, if a holographic mirror is used, the RGB LED or the RGB laser may be used depending on recording characteristics. The diffuser 220 may be implemented in the form of a film, and light uniformity between the light source 210 and the display panel 230 may be provided through the diffuser 220. According to an example embodiment, the diffuser 220 may be formed directly on the display panel 230. According to another example embodiment, the diffuser 220 may be spaced apart from the display panel 230.

The display panel 230 may include a liquid crystal display (LCD) panel, or a spatial light modulator (SLM) such as a digital light processor (DLP) and liquid crystal on silicon (LCoS). The 3D optical layer 240 may be any one of a parallax barrier, a lenticular lens, and a directional backlight unit. The display panel 230 may display an HUD image, and the 3D optical layer 240 may control a path of the light corresponding to the HUD image. For example, the 3D optical layer 240 may give directivity to the light corresponding to the HUD image so that images of different viewpoints may be provided to both eyes of the user.

Figure 3:
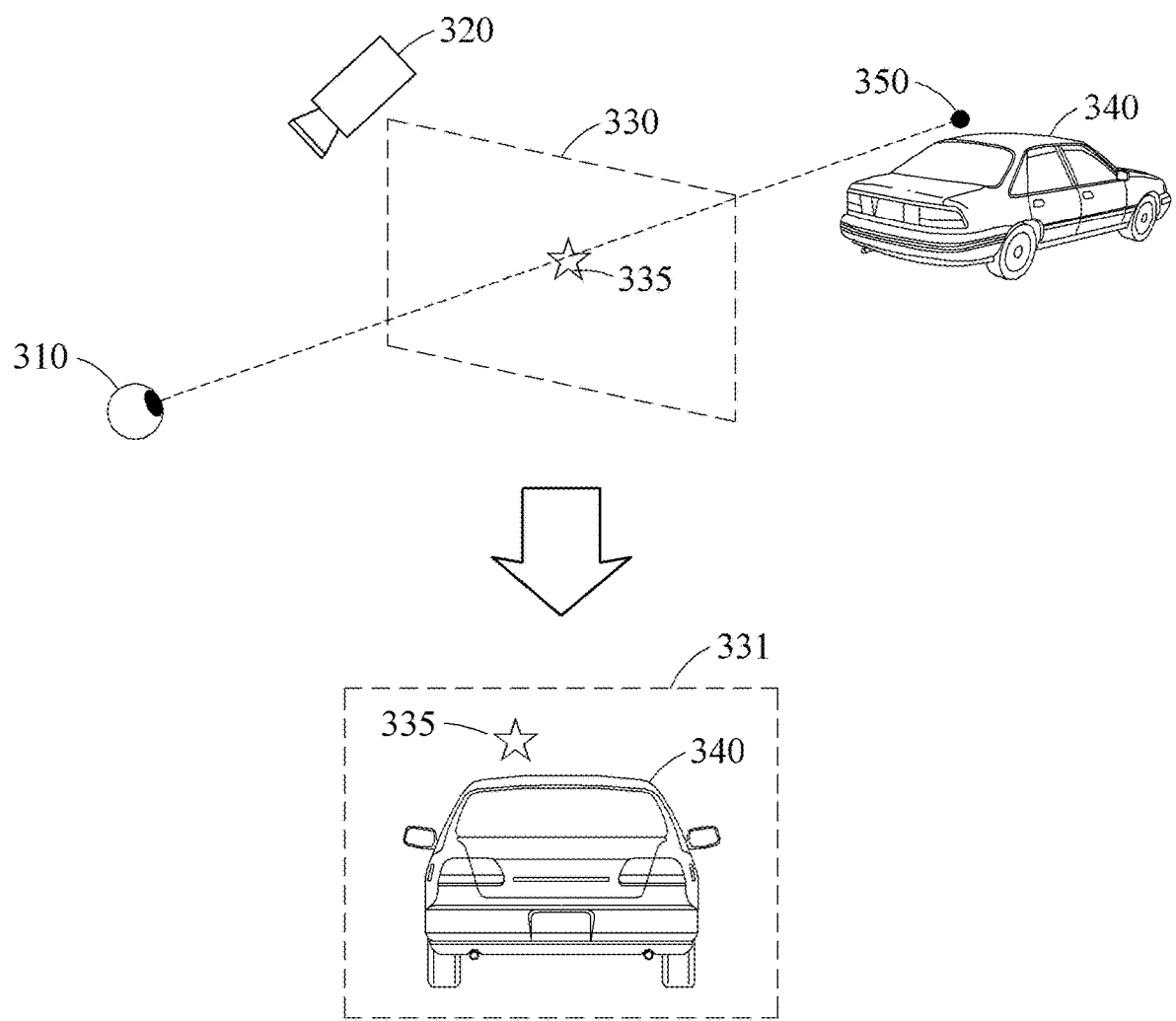
FIG. 3 illustrates three-dimensional (3D) augmented reality (AR) according to an example embodiment.

FIG. 3 illustrates 3D AR according to an example embodiment. Referring to FIG. 3, a virtual object 335 is displayed at an intersecting point where a line connecting an eye position 310 of the user and a target position 350 intersects with a virtual screen 330. The eye position 310 may be tracked through an eye tracking camera 320. In this case, a scene 331 may be viewed at the eye position 310. The scene 331 includes the virtual object 335 and a real object 340. The virtual object 335 may be accurately displayed at the target position 350 through a relationship between a coordinate system of the eye tracking camera 320 and a coordinate system of the virtual screen 330, 3D information on the background, and information on the eye position 310.

This process may be performed for each of the eyes of the user. For example, a first source image (for example, a left image) may be generated so that the virtual object 335 may be displayed at an intersecting point where a line connecting a first viewpoint (for example, the left eye) and the target position 350 intersects with the virtual screen 330, and a second source image (for example, a right image) may be generated so that the virtual object 335 may be displayed at an intersecting point where a line connecting a second viewpoint (for example, the right eye) and the target position 350 intersects with the virtual screen 330. Thereafter, the scene 331 may be implemented as a 3D AR HUD by rendering the HUD image based on the first source image and the second source image.

According to an example embodiment, the 3D HUD may represent the virtual object 335 at various depths in response to a change in the position of the user, and as such, the 3D HUD may more accurately display the virtual object 335 at the target position 350 than a 2D HUD. However, in order to stably provide such a 3D HUD, continuous tracking of the eye position 310 may be necessary and the virtual object 335 may be displayed on the virtual screen 330 based on the tracked eye position 310.

In an example scenario, the eye position 310 may not be tracked due to an environmental factor, such as low illuminance or because the eye is covered. Moreover, an appropriate HUD image corresponding to the current eye position 310 may not be generated due to a systemic factor such as a system delay. In this example, a deterioration in the quality of the 3D HUD, such as crosstalk observed in the image as an image for the left eye is provided to the right eye, may occur. In this case, driving information may be stably provided by providing a 2D HUD instead of the low-quality 3D HUD. According to example embodiments, 2D rendering or 3D rendering may be selectively performed based on a current circumstance associated with eye tracking, whereby the HUD stability may be improved.

Figure 4:
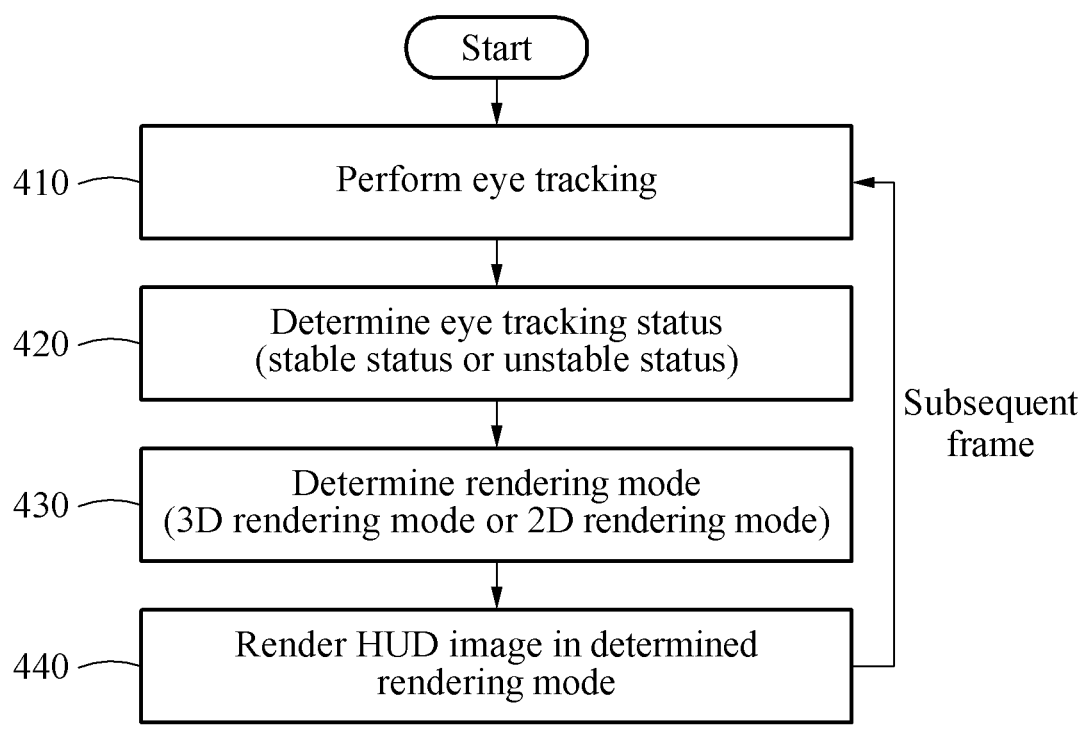
FIG. 4 illustrates a process of generating an HUD image according to an example embodiment.

FIG. 4 illustrates a process of generating an HUD image according to an example embodiment. Operations 410 to 440 described below may be performed on a current frame of a user image. Referring to FIG. 4, in operation 410, an HUD control apparatus performs eye tracking. For example, the HUD control apparatus may generate a user image using an eye tracking camera and perform eye tracking on the user image. The HUD control apparatus may generate an eye tracking result while performing eye tracking. If eye tracking is successful, the eye tracking result may include eye coordinates. If eye tracking fails, the eye tracking result may not include eye coordinates. Instead, the eye tracking results may include information indicating that eye tracking has failed. The eye coordinates may include 3D coordinate values of each of the eyes.

In operation 420, the HUD control apparatus determines an eye tracking status. For example, the HUD control apparatus may classify the eye tracking status as one of a stable status and an unstable status based on whether the eye tracking result complies with a 3D rendering condition. Here, the 3D rendering condition may be defined based on the presence of eye coordinates and a rate of change of the eye coordinates. As described above, in order to maintain the quality of a 3D HUD image, eye coordinates must be identified, and system performance for tracking a change in the eye coordinates is required.

For example, if eye coordinates are absent, or if there are eye coordinates but the eye coordinates change so severely that the rendering performance of the system is incapable of coping with the change, crosstalk is likely to be observed in a 3D HUD image. Accordingly, in a first state in which the eye tracking result includes the eye coordinates and a speed of position change with respect to the eye coordinates is less than a threshold, the eye tracking status may be classified as the stable state. In this case, the threshold may correspond to a system processing rate. In addition, in a second state in which the eye tracking result includes the eye coordinates and the speed of position change with respect to the eye coordinates is greater than the threshold, or in a third state in which the eye tracking result does not include the eye coordinates, the eye tracking status may be classified as the unstable status.

In operation 430, the HUD control apparatus determines a rendering mode. Here, the determined rendering mode may be used to render an HUD image corresponding to a current frame of the user image. The rendering mode may include a 2D rendering mode and a 3D rendering mode. The HUD control apparatus may determine the rendering mode for an HUD image to be one of the 2D rendering mode and the 3D rendering mode based on the eye tracking status. For example, if the eye tracking status is classified as the stable status, the HUD control apparatus may determine the rendering mode to be the 3D rendering mode. Conversely, if the eye tracking status is classified as the unstable status, the HUD control apparatus may determine the rendering mode to be the 2D rendering mode.

The HUD control apparatus may render the HUD image so that the same HUD image is provided to both eyes of the user in the 2D rendering mode, or may render the HUD image so that different images are provided to both eyes of the user in the 3D rendering mode. For example, the HUD control apparatus may generate a first source image (for example, a left image) for a first viewpoint (for example, the left eye) and a second source image (for example, a right image) for a second viewpoint (for example, the right eye), and render the HUD image so that the first source image may be provided to the first viewpoint and the second source image may be provided to the second viewpoint. If the rendering mode is determined to be the 2D rendering mode, the HUD control apparatus may render the HUD image by setting the first viewpoint and the second viewpoint equally as a single viewpoint. Conversely, if the rendering mode is determined to be the 3D rendering mode, the HUD control apparatus may render the HUD image by setting the first viewpoint and the second viewpoint as different viewpoints.

The 2D rendering mode may include a tracking 2D rendering mode and a fixed 2D rendering mode. As described above, in the second state in which the eye tracking result includes the eye coordinates and the speed of position change with respect to the eye coordinates is greater than the threshold, or in the third state in which the eye tracking result does not include the eye coordinates, the eye tracking status may be classified as the unstable status. In the case of the second state, since the eye coordinates are present, the tracking 2D rendering mode may be performed using the eye coordinates. For example, if the eye tracking result includes current eye coordinates of both eyes and a speed of position change with respect to the current eye coordinates is greater than the threshold, the first viewpoint of the first source image and the second viewpoint of the second source image may set equally as a center viewpoint of the current eye coordinates. On the other hand, in the case of the third state, since eye coordinates are absent, the fixed 2D rendering mode may be performed using eye coordinates previously obtained. For example, if the eye tracking result does not include the current eye coordinates, the first viewpoint and the second viewpoint may be set equally as a center viewpoint of previous eye coordinates recently used.

In operation 440, the HUD control apparatus renders the HUD image in the determined rendering mode. The HUD image may be displayed by a display device and provided to the user through a 3D optical layer. If 3D rendering is performed, the HUD image may traverse through the 3D optical layer such that images of different viewpoints may be provided to both eyes of the user. Even if 2D rendering is performed, the HUD image may be provided to the user through the 3D optical layer. However, in this case, unlike 3D rendering, an image of the same viewpoint may be provided to both eyes of the user. After operation 440 is performed on the current frame as described above, operations 410 to 440 may be performed on a subsequent frame. This process may be performed for each frame of the user image.

Figure 5:
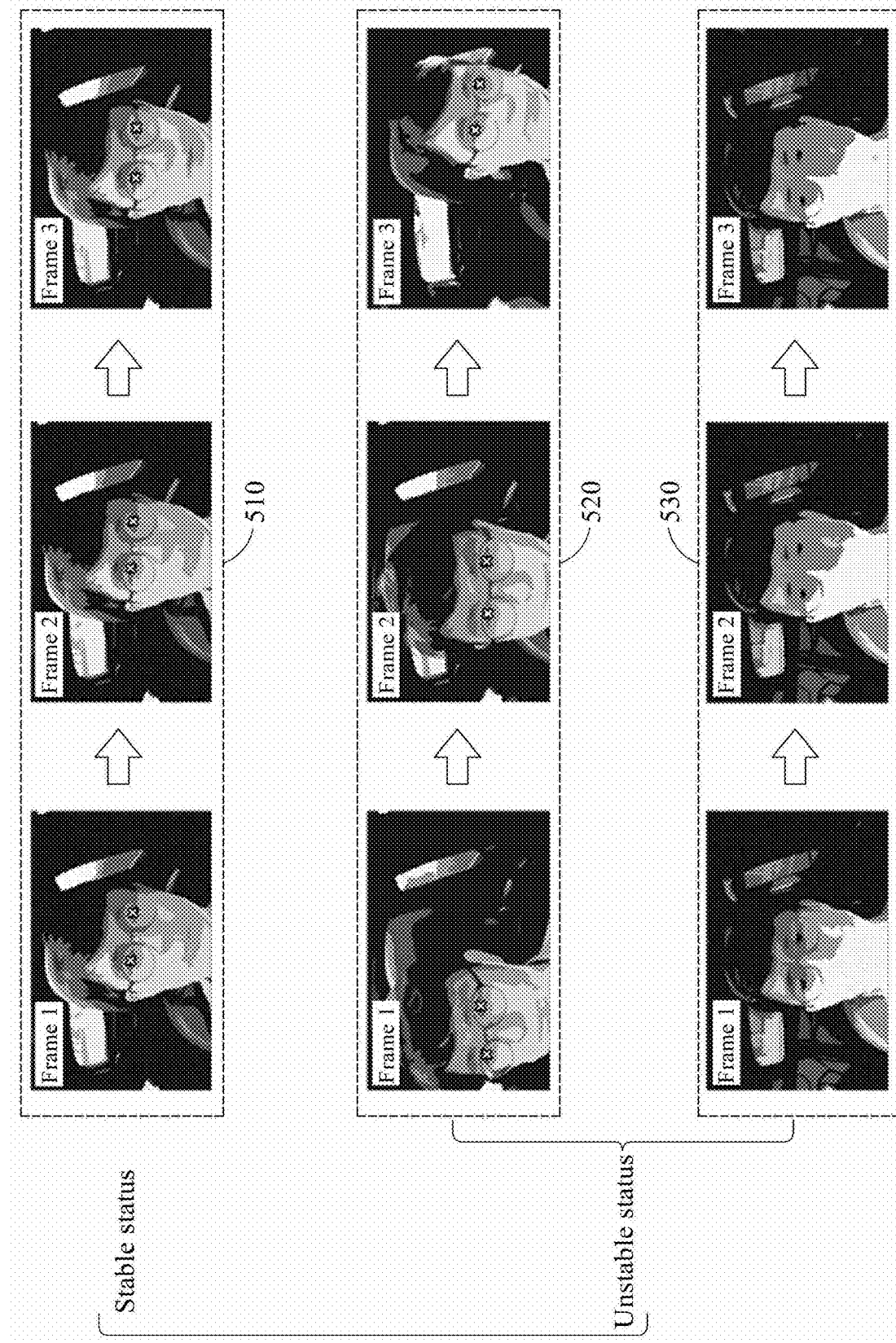
FIG. 5 illustrates eye tracking statuses according to an example embodiment.

FIG. 5 illustrates eye tracking status according to an example embodiment. Referring to FIG. 5, eye coordinates at positions marked with "X" may be obtained for each frame in a user image 510 by performing eye tracking on the user image 510. In addition, since the eye coordinates for each frame do not change greatly, an eye tracking status of the user image 510 may be classified as a stable status.

For a user image 520 as well, eye coordinates at positions marked with "X" may be obtained for each frame through eye tracking. However, since the eye coordinates for each frame of the user image 520 change greatly, an eye tracking status of the user image 520 may be classified as an unstable status. For example, when a vehicle drives over a speed bump, drives on an uneven road, or takes a sharp curve, the eye positions may quickly change as shown in the user image 520.

A user image 530 does not have "X" marks corresponding to eye positions each of the frames illustrating a case in which eye tracking fails. For example, eye tracking may fail as in the user image 530 due to an environmental factor such as low illuminance or occlusion.

If the eye tracking status is classified as a stable status as in the user image 510, the HUD image may be rendered through a 3D rendering mode. If the eye tracking status is classified as an unstable status as in the user images 520 and 530, the HUD image may be rendered through a 2D rendering mode. If eye coordinates are present as in the user image 520, a tracking 2D rendering mode may be performed. If eye coordinates are absent as in the user image 530, a fixed 2D rendering mode may be performed.

Figure 6:
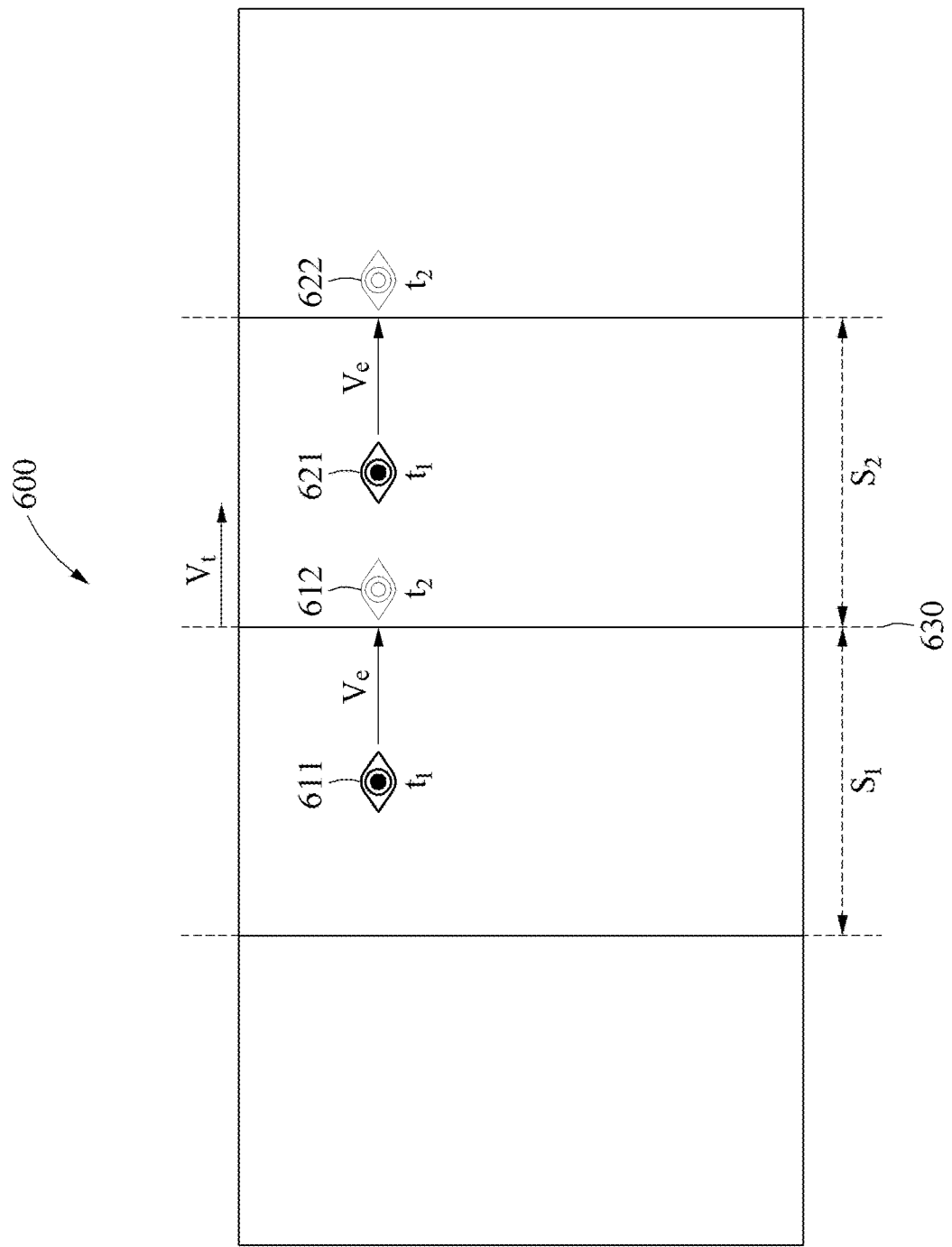
FIG. 6 illustrates eye movements in a viewing space according to an example embodiment.

FIG. 6 illustrates eye movements in a viewing space according to an example embodiment. Referring to FIG. 6, a viewing space 600 includes a first viewing space $S_1$ in which a first source image is viewed and a second viewing space $S_2$ in which a second source image is viewed. An eye position 611 is a position of a first viewpoint (for example, the left eye) at a time $t_1$, and an eye position 621 is a position of a second viewpoint (for example, the right eye) at the time $t_1$. A difference between the time $t_1$ and a time $t_2$ may correspond to a time difference between two consecutive frames. A user may view the first source image through the first viewpoint of the eye position 611 and view the second source image through the second viewpoint of the eye position 621. The first viewing space $S_1$ and the second viewing space $S_2$ may be divided through a borderline 630. An HUD control apparatus may adjust the borderline 630 in response to changes in the eye positions 611 and 621, so that the eye position 611 may stay in the first viewing space $S_1$ and the eye position 621 may stay in the second viewing space $S_2$.

The eye position 611 is the position of the first viewpoint at the time $t_1$, and an eye position 612 is a position of the first viewpoint at the time $t_2$. Further, the eye position 621 is the position of the second viewpoint at the time $t_1$, and an eye position 622 is a position of the second viewpoint at the time $t_2$. Thus, a speed of change (or speed of movement) of the eye positions 611 and 621 (or the eye coordinates) may be defined as $V_e$. In addition, a speed of adjustment (or speed of movement) of the borderline 630 may be defined as $V_r$. $V_e$ and $V_r$ may correspond to a variation of the eye positions 611 and 621 and a variation of the borderline 630 during the time difference between the two consecutive frames. Since system processing such as updating an HUD image is required to adjust the borderline 630, the maximum value of $V_r$ may be limited by the system processing rate. If $V_e$ is greater than the maximum value of $V_r$, the eye position 612 of the first viewpoint may be in the second viewing space $S_2$, and the eye position 622 of the second viewpoint may be in the first viewing space $S_1$, for example, as shown in FIG. 6. Accordingly, crosstalk may be observed.

A threshold may be set based on the system processing rate. The threshold may be a speed of the borderline 630 that is adjustable to the maximum based on the system processing rate. For example, the threshold may be set to 240 millimeters per second (mm/s). In this case, if a speed of change of the eye positions 611 and 621 (or the eye coordinates) is greater than the threshold in a frame of a user image, an eye tracking status for the frame may be determined to be an unstable status. Accordingly, an HUD image corresponding to the frame may be rendered through a 2D rendering mode. In detail, since eye coordinates are present, a tracking 2D rendering mode may be used.

Figure 7:
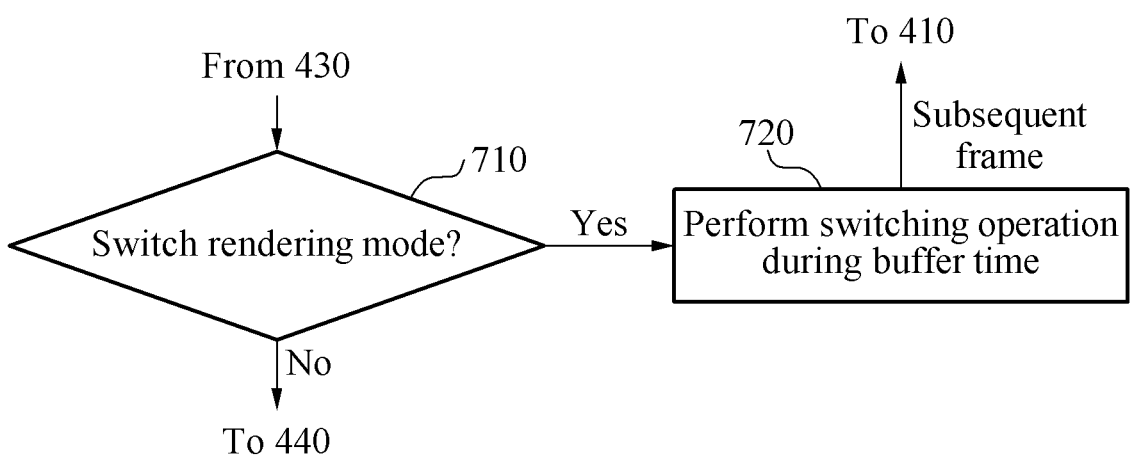
FIG. 7 illustrates a process of switching a rendering mode according to an example embodiment.

FIG. 7 illustrates a process of switching a rendering mode according to an example embodiment. For example, the switching of the rendering mode may include switching from a 2D rendering mode to a 3D rendering mode and switching from a 3D rendering mode to a 2D rendering mode. In another example, the switching of the rendering mode may include switching from one of a tracking 2D rendering mode, a fixed 2D rendering mode, and a 3D rendering mode to another of the tracking 2D rendering mode, the fixed 2D rendering mode, and the 3D rendering mod. While the rendering mode is switched, a change in viewpoint may occur in an HUD image and cause a user to feel uncomfortable when viewing the HUD image. According to example embodiments, to reduce such discomfort, switching of the rendering mode may be performed for a predetermined time.

Referring to FIG. 7, in operation 710, the HUD control apparatus determines whether to switch the rendering mode. For example, in operation 710, after the rendering mode is determined in operation 430 of FIG. 4, it is determined as to whether to switch the rendering mode based on the determination of operation 430. For example, if the rendering mode is determined to be a 3D rendering mode in operation 430 for iteration on a previous frame and the rendering mode is determined to be a 2D rendering mode in operation 430 for iteration on a current frame, the rendering mode is to be switched. In this case, operation 720 may be performed.

In operation 720, the HUD control apparatus performs a switching operation during a buffer time. The buffer time may correspond to a plurality of frames. For example, if the frame rate of the HUD image is 60 frames per second (fps), the buffer time may correspond to 1 sec=60 frames. If the rendering mode is to be switched from the 2D rendering mode to the 3D rendering mode, the HUD control apparatus may render the HUD image while gradually changing a first viewpoint and a second viewpoint to a single viewpoint used in the 2D rendering mode over the buffer time. The switching operation will be described further with reference to FIG. 8.

If the rendering mode is determined to be a 3D rendering mode in operation 430 for iteration on a previous frame and the rendering mode is maintained to be the 3D rendering mode in operation 430 for iteration on a current frame, the rendering mode is not to be switched. In this case, the HUD image corresponding to the current frame may be rendered in the 3D rendering mode through operation 440 of FIG. 4.

Figure 8:
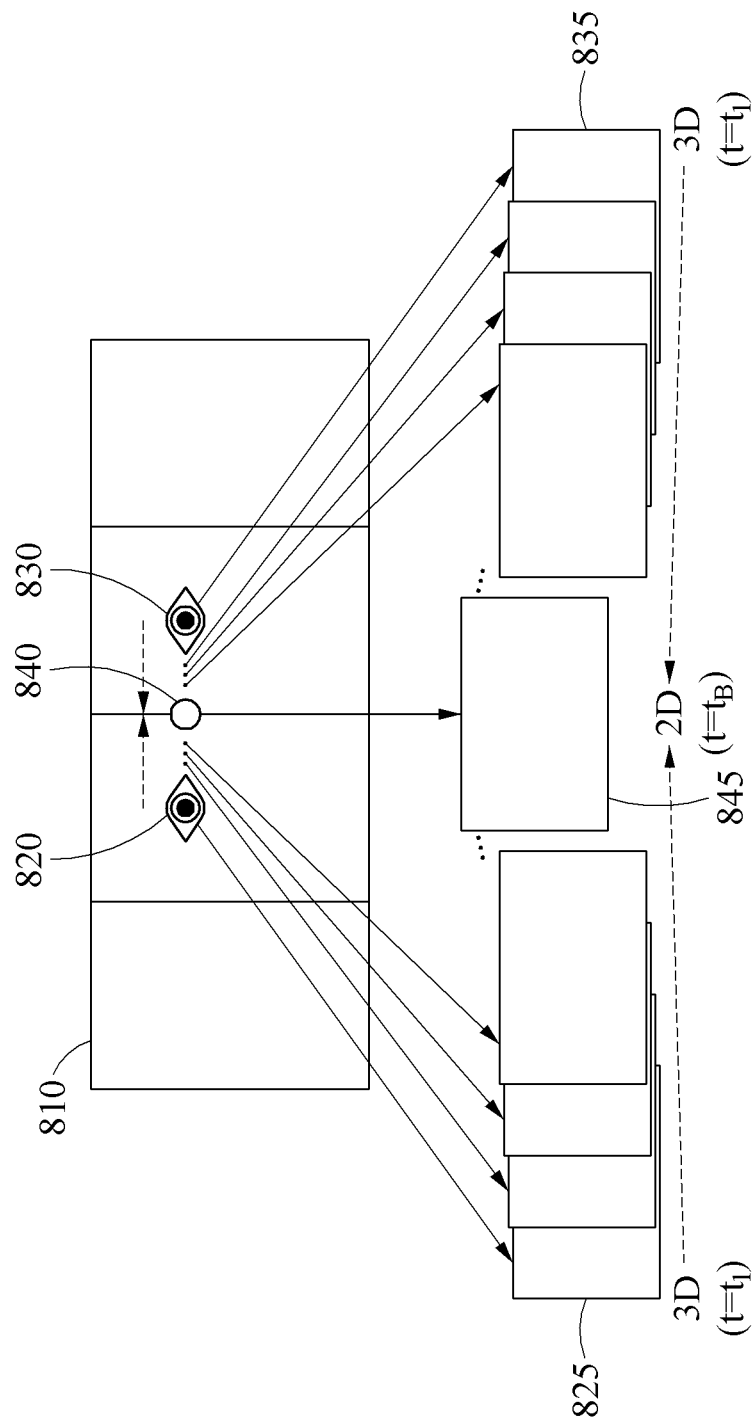
FIG. 8 illustrates buffer viewpoints and buffer source images for switching a rendering mode according to an example embodiment.

FIG. 8 illustrates buffer viewpoints and buffer source images for switching a rendering mode according to an example embodiment. FIG. 8 shows an example of switching a rendering mode from a 3D rendering mode to a 2D rendering mode. However, the disclosure is not limited thereto, and the example of FIG. 8 and the following description may also apply to another type of switching process according to another example embodiment. Referring to FIG. 8, a first viewpoint 820 (for example, the left eye), a second viewpoint 830 (for example, the right eye), and a center viewpoint 840 are shown in a viewing space 810. The center viewpoint 840 may be in the middle of the first viewpoint 820 and the second viewpoint 830. Buffer viewpoints may be between the first viewpoint 820 and the center viewpoint 840 and between the second viewpoint 830 and the center viewpoint 840. The number of buffer viewpoints may correspond to a buffer time. For example, if the buffer time corresponds to 60 frames, 60 buffer viewpoints may be between the first viewpoint 820 and the center viewpoint 840, and 60 buffer viewpoints may be between the second viewpoint 830 and the center viewpoint 840.

A first source image 825 may correspond to the first viewpoint 820, a second source image 835 may correspond to the second viewpoint 830, and a center source image 845 may correspond to the center viewpoint 840. In addition, there may be buffer source images corresponding to the buffer viewpoints. In a 3D rendering mode, a 3D HUD may be provided by rendering the HUD image based on the first source image 825 and the second source image 835. Further, in a 2D rendering mode, a 2D HUD may be provided by rendering the HUD image based on the center source image 845. If the rendering mode is switched from the 3D rendering mode to the 2D rendering mode, a 3D HUD image may be rendered based on the first source image 825 and the second source image 835 at a time $t_1$, buffer HUD images may be rendered based on buffer source images from a time $t_2$ to a time $t_{B-1}$, and a 2D HUD image may be rendered based on the center source image 845 at a time $t_B$. B may correspond to a buffer time.

The buffer source images may be generated based on an interpolation operation based on the first source image 825, the second source image 835, and the center source image 845. For example, center source images corresponding to the buffer viewpoints between the first viewpoint 820 and the center viewpoint 840 may be generated through an interpolation operation using the first source image 825 and the center source image 845, and center source images corresponding to the buffer viewpoints between the second viewpoint 830 and the center viewpoint 840 may be generated through an interpolation operation using the second source image 835 and the center source image 845.

Figure 9:
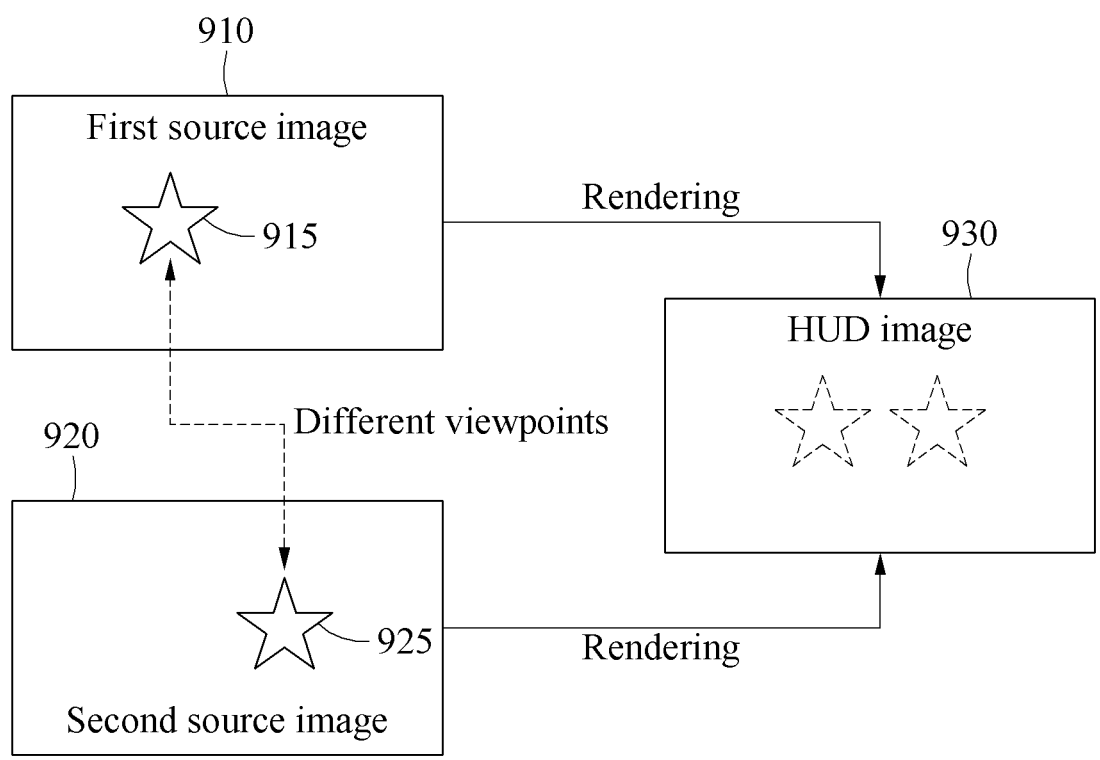
FIG. 9 illustrates images in a 3D rendering mode according to an example embodiment.

FIG. 9 illustrates images in a 3D rendering mode according to an example embodiment. Referring to FIG. 9, a first source image 910 includes a virtual object 915 at a position corresponding to a first viewpoint, and a second source image 920 includes a virtual object 925 at a position corresponding to a second viewpoint. In FIG. 9, the first viewpoint and the second viewpoint are different viewpoints. The first source image 910 is generated for displaying the virtual object 915 at an intersecting point where a line connecting the first viewpoint and a target position intersects with a virtual screen, and the second source image 920 is generated for displaying the virtual object 925 at an intersecting point where a line connecting the second viewpoint and the target position intersects with the virtual screen. An HUD image 930 may be generated through 3D rendering based on the first source image 910 and the second source image 920, such that a user viewing the HUD image 930 may experience the virtual object 915 in 3D.

Figure 10:
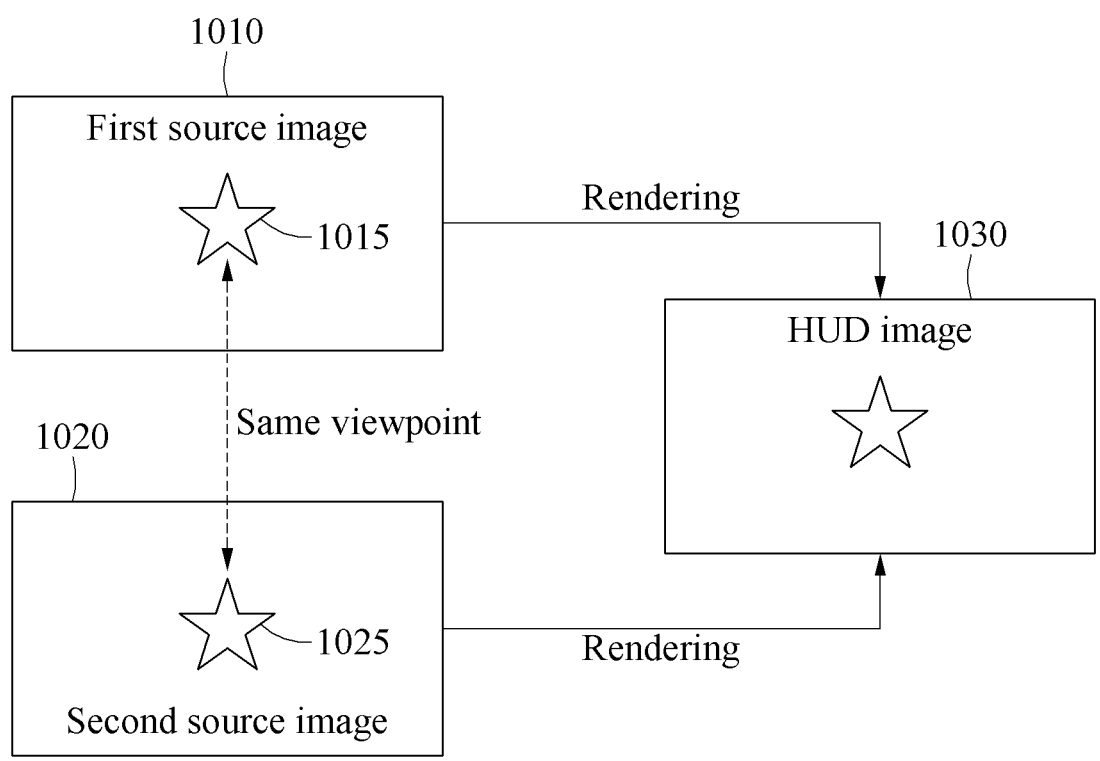
FIG. 10 illustrates images in a two-dimensional (2D) rendering mode according to an example embodiment.

FIG. 10 illustrates images in a 2D rendering mode according to an example embodiment. Unlike the example of FIG. 9, the first viewpoint and the second viewpoint in FIG. 10 correspond to the same viewpoint. Thus, a virtual object 1015 of a first source image 1010 and a virtual object 1025 of a second source image 1020 are located at the same position. An HUD image 1030 may be generated through 2D rendering based on the first source image 1010 and the second source image 1020.

For example, the first source image 910 and the second source image 920 of FIG. 9 may correspond to the first source image 825 and the second source image 835 of FIG. 8. Further, the first source image 1010 and the second source image 1020 of FIG. 10 may correspond to the center source image 845 of FIG. 8. In addition, the buffer source images of FIG. 8 may be generated through an interpolation operation based on the first source image 910, the second source image 920, and the first source image 1010 (or the second source image 1020).

Figure 11:
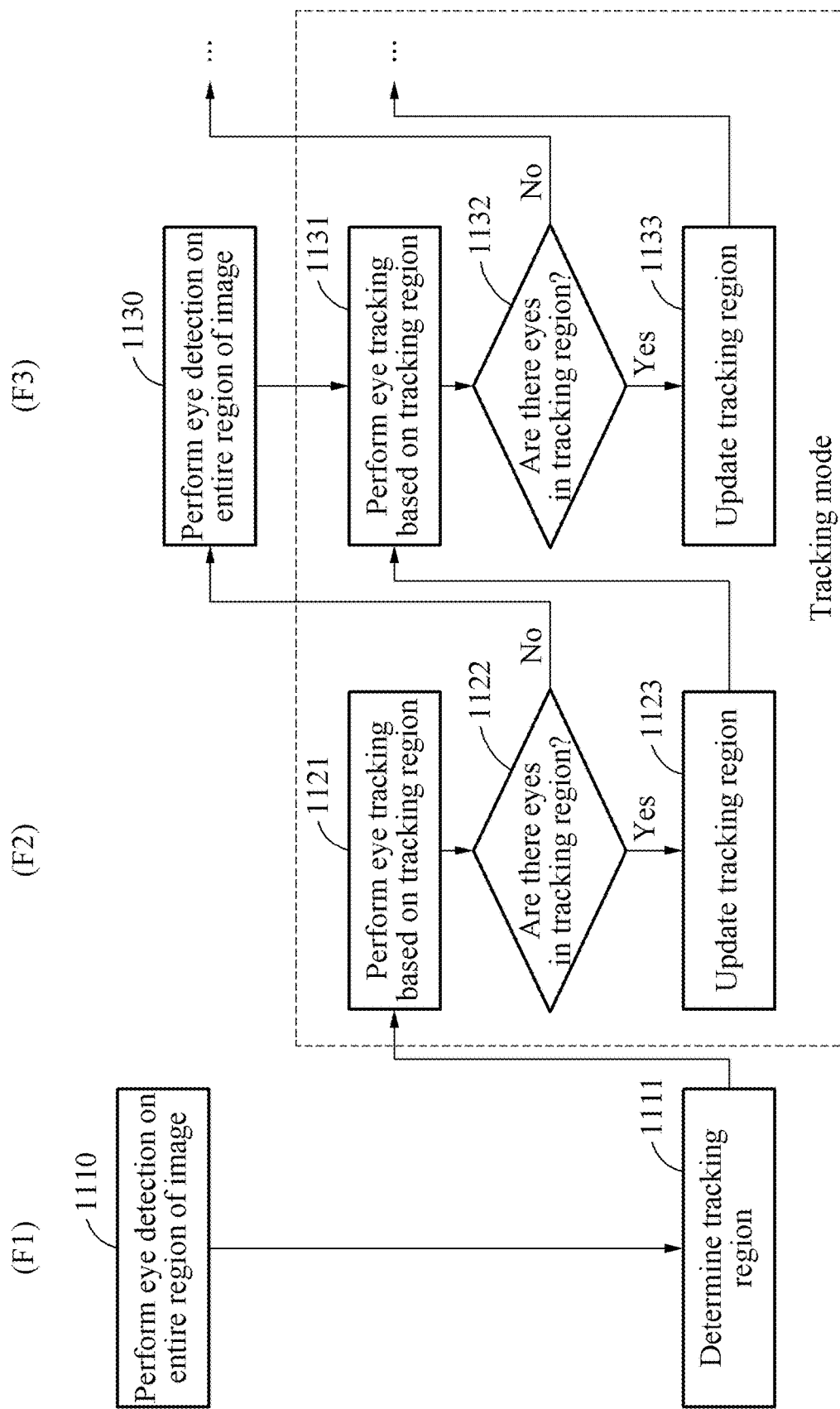
FIGS. 11 and 12 illustrate a process of tracking eyes using a tracking region according to an example embodiment.
Figure 12:
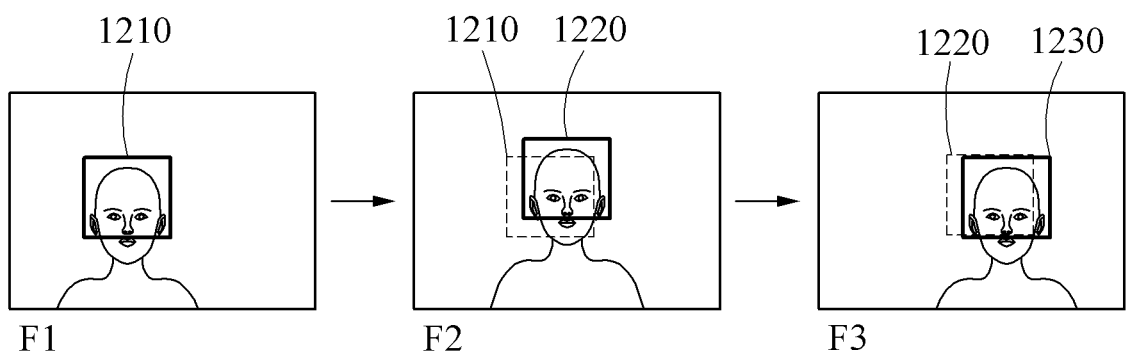

FIGS. 11 and 12 illustrate a process of tracking eyes using a tracking region according to an example embodiment. The process of tracking the eyes may include using a tracking region described below. Referring to FIG. 11, operations 1110 and 1111 are operations performed on a first frame F1 of a user image. In operation 1110, an HUD control apparatus performs eye detection on an entire region of an image of the first frame F1. For example, the HUD control apparatus may determine a detection region corresponding to eyes by scanning the entire image. In operation 1111, the HUD control apparatus determines a tracking region. The HUD control apparatus may determine the tracking region based on the detection region. For example, the size of the tracking region may be determined based on the size of the detection region, and the position of the tracking region may be determined to include the detection region at the center thereof.

Next, operations 1121 to 1123 are operations performed on a second frame F2 of the user image. In operation 1121, the HUD control apparatus performs eye tracking based on the tracking region. For example, the HUD control apparatus may detect the eyes within the tracking region by scanning the tracking region, rather than scanning an entire region of an image of the second frame F2. Such eye detection using the tracking region may be referred to as eye tracking. In operation 1122, the HUD control apparatus determines whether there are eyes in the tracking region. If the eyes are in the tracking region, the HUD control apparatus updates the tracking region, in operation 1123. In the same manner as the tracking region is determined based on the detection region of the first frame F1, the tracking region may be updated based on a detection region of the second frame F2.

Next, operations 1130 to 1133 are operations performed on a third frame F3 of the user image. In response to the determination of operation 1122 that there are no eyes in the tracking region, the HUD control apparatus terminates a tracking mode and returns to a detection mode to perform eye detection in an entire region of an image of the third frame F3, in operation 1130. If the tracking region is updated in operation 1123 in response to the determination of operation 1122 that there are eyes in the tracking region, the HUD control apparatus performs eye tracking based on the updated tracking region, in operation 1131. The details of operations 1131 to 1133 are the same as those of operations 1121 to 1123. As described above, if there are eyes in a tracking region, the tracking region may be updated and a tracking mode may be maintained. However, if there are no eyes in the tracking region, a detection mode may be activated again to scan the entire image.

Referring to FIG. 12, frames F1, F2, and F3 of a user image are shown. The HUD control apparatus determines a detection region in the frame F1, and determines a first tracking region 1210 based on the detection region. The eyes in the frame F2 may be at an upper right position than the eyes in the frame F1. The HUD control apparatus detects the eyes from a first tracking region 1210 in the frame F2. Since the eyes are detected in the first tracking region 1210, the HUD control apparatus updates a tracking region based on a detection region within the first tracking region 1210 in the frame F2. Accordingly, a second tracking region 1220 is determined. In the same manner as in the frame F2, the eyes may be detected from the second tracking region 1220 in the frame F3, and a third tracking region 1230 may be determined by updating the tracking region. In this way, in response to the determination that the eyes are included in each tracking region, the HUD control apparatus may track the eyes without scanning the entire image.

Figure 13:
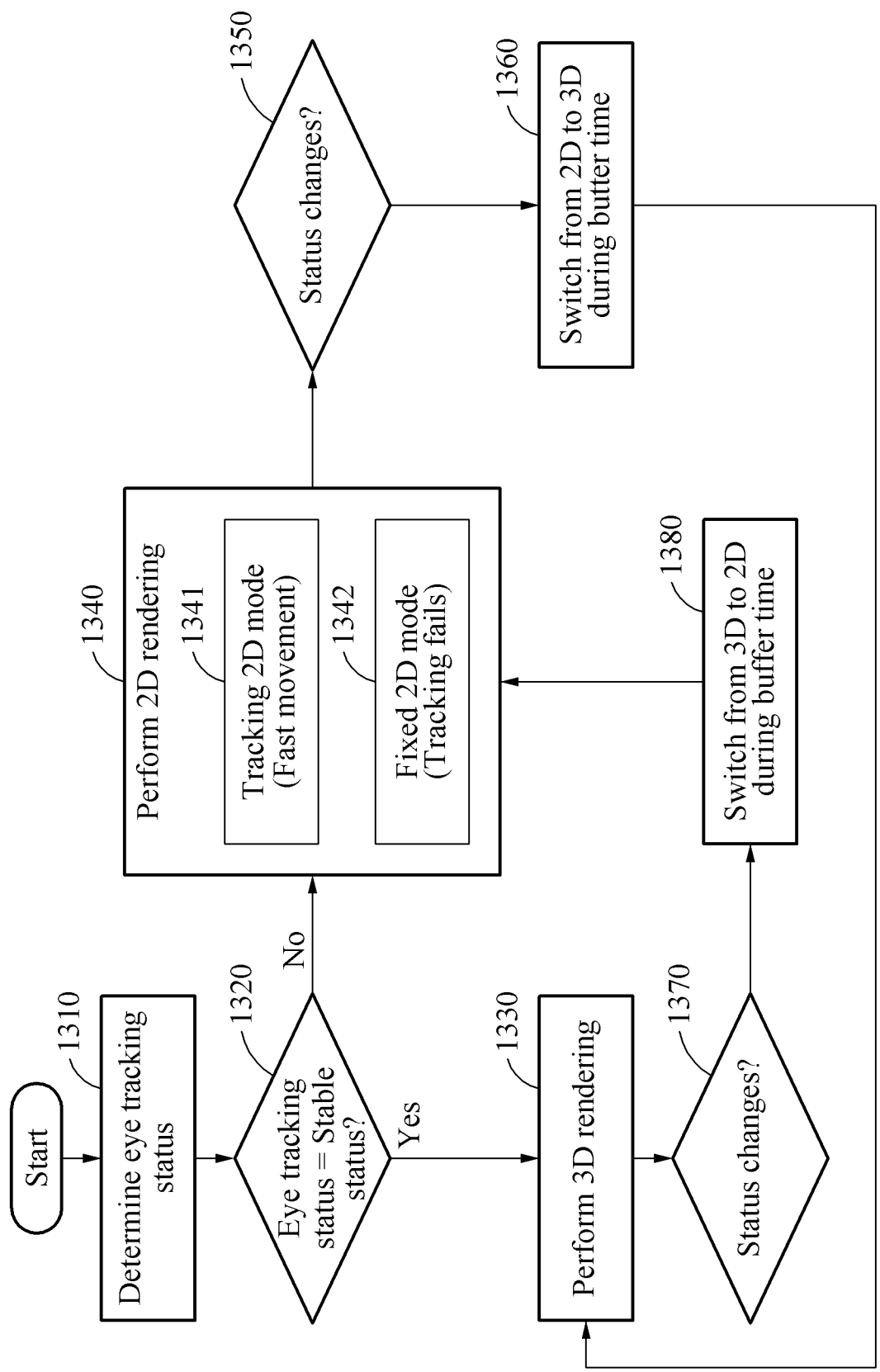
FIG. 13 illustrates a process of generating an HUD image based on eye tracking according to an example embodiment.

FIG. 13 illustrates a process of generating an HUD image based on eye tracking according to an example embodiment. Referring to FIG. 13, in operation 1310, an HUD control apparatus determines an eye tracking status. In operation 1320, the HUD control apparatus determines whether the eye tracking status is a stable status. According to the example embodiments described with reference to FIGS. 11 and 12, eye tracking may be performed using a tracking region.

If the eye tracking status corresponds to the stable status, the HUD control apparatus performs 3D rendering, in operation 1330. If the eye tracking status does not correspond to the stable status, the HUD control apparatus performs 2D rendering, in operation 1340. For example, if the eye positions are determined in the tracking region through eye tracking, but a speed of change in the eye positions is faster than a threshold, tracking 2D rendering may be performed, in operation 1341. When the eye positions are not determined in the tracking region through eye tracking, fixed 2D rendering may be performed, in operation 1342. In this case, a tracking mode for eye tracking may be canceled, and a detection mode may be activated again.

While 2D rendering is performed through operation 1340, the HUD control apparatus checks whether the status changes, in operation 1350. For example, a case in which the status changes may include a case in which the speed of change in the eye positions is reduced below the threshold while tracking 2D rendering is performed, and a case in which the speed of change in the eye positions is less than the threshold although the eyes are detected outside the tracking region while fixed 2D rendering is performed. If the status changes, the HUD control apparatus switches the rendering mode from a 2D rendering mode to a 3D rendering mode during a buffer time, in operation 1360. Then, in operation 1330, the HUD control apparatus performs 3D rendering.

Similarly, while 3D rendering is performed through operation 1330, the HUD control apparatus checks whether the status changes, in operation 1370. For example, a case in which the status changes may include a case in which the speed of change in the eye positions exceeds the threshold, and a case in which the eyes are not detected in a tracking region. If the status changes, the HUD control apparatus switches the rendering mode from the 3D rendering mode to the 2D rendering mode during a buffer time, in operation 1380. Then, in operation 1340, the HUD control apparatus performs 2D rendering.

Figure 14:
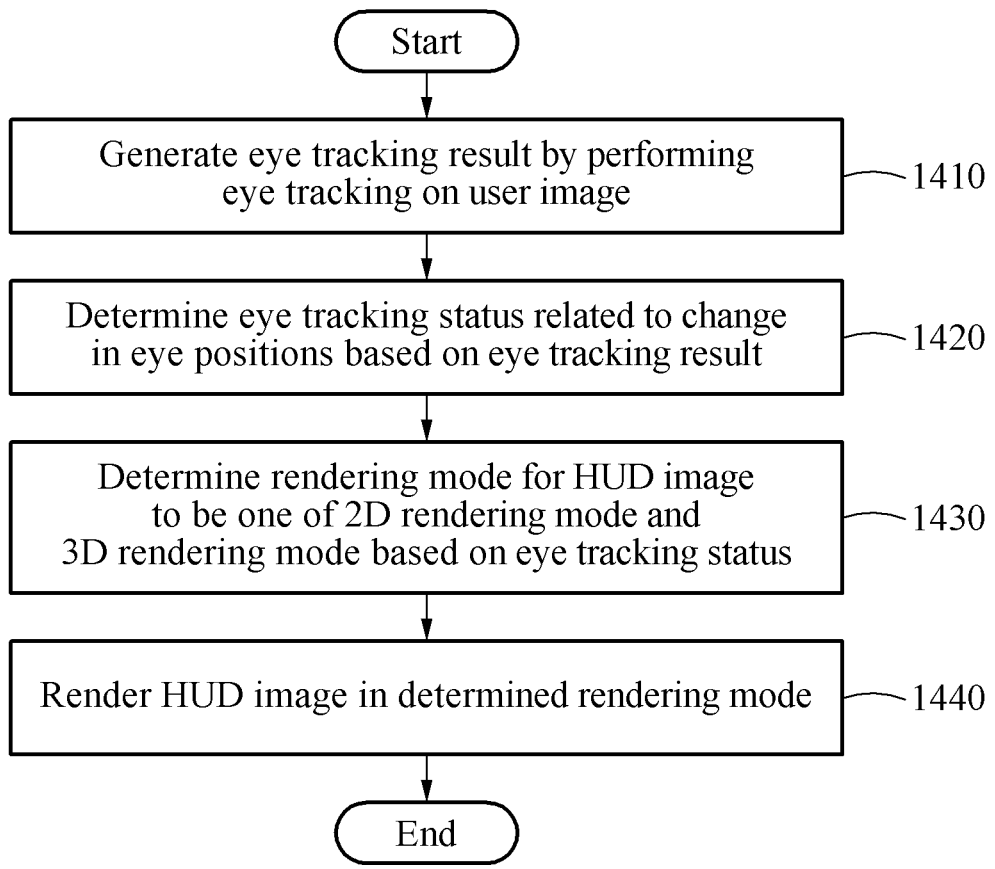
FIG. 14 illustrates a method of controlling an HUD considering an eye tracking status according to an example embodiment.

FIG. 14 illustrates a method of controlling an HUD considering an eye tracking status according to an example embodiment, and further describes the example of FIG. 4. Referring to FIG. 14, in operation 1410, an HUD control apparatus generates an eye tracking result by performing eye tracking on a user image. In operation 1420, the HUD control apparatus determines an eye tracking status related to a change in eye positions based on the eye tracking result. In operation 1430, the HUD control apparatus determines a rendering mode for an HUD image to be one of a 2D rendering mode and a 3D rendering mode based on the eye tracking status. In operation 1440, the HUD control apparatus renders the HUD image in the determined rendering mode. In addition, the description provided with reference to FIGS. 1A to 13, 15, and 16 may apply to the method of controlling an HUD, and thus, a detailed description will be omitted for conciseness.

Figure 15:
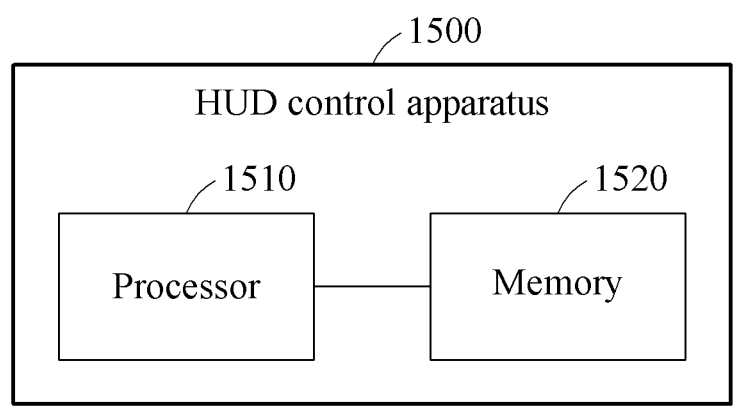
FIG. 15 illustrates a configuration of an HUD control apparatus according to an example embodiment.

FIG. 15 illustrates a configuration of an HUD control apparatus according to an example embodiment. Referring to FIG. 15, an HUD control apparatus 1500 includes a processor 1510 and a memory 1520. The memory 1520 is connected to the processor 1510, and may store instructions executable by the processor 1510, data to be computed by the processor 1510, or data processed by the processor 1510. The memory 1520 may include a non-transitory computer-readable medium (for example, a high-speed random access memory) and/or a non-volatile computer-readable medium (for example, a disk storage device, a flash memory device, or another non-volatile solid-state memory device). However, the disclosure is not limited thereto, and according to another example embodiment, the memory 1520 may be storage devices configured to store data, information and/or instructions.

The processor 1510 may execute instructions to perform the operations described with reference to FIGS. 1A to 14, and 16. For example, the processor 1510 may generate an eye tracking result by performing eye tracking on the user image, determine an eye tracking status related to a change in eye positions based on the eye tracking result, determine a rendering mode for an HUD image to be one of a 2D rendering mode and a 3D rendering mode based on the eye tracking status, and render the HUD image in the determined rendering mode. In addition, the description provided with reference to FIGS. 1A to 14, and 16 may apply to the HUD control apparatus 1500, and thus, a detailed description will be omitted for conciseness.

Figure 16:
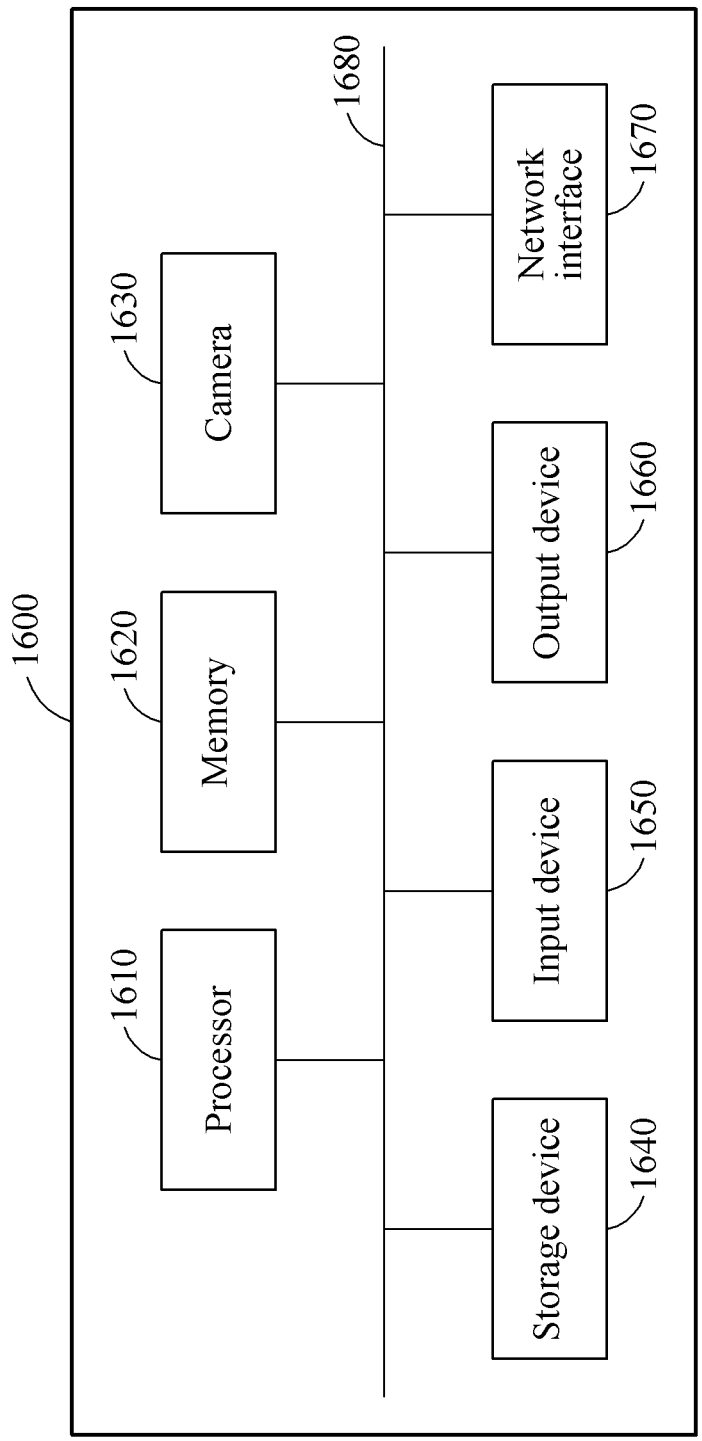
FIG. 16 illustrates a configuration of an electronic device according to an example embodiment.

FIG. 16 illustrates a configuration of an electronic device according to an example embodiment. Referring to FIG. 16, an electronic device 1600 may acquire a user image, track eyes from the acquired user image, and provide an AR HUD image based on an eye tracking status. The electronic device 1600 may structurally and/or functionally include the HUD device 100 of FIG. 1A, the HUD control apparatus 110 of FIG. 1A and/or the HUD control apparatus 1500 of FIG. 15. For instance, the HUD device 100 of FIG. 1A, the HUD control apparatus 110 of FIG. 1A and/or the HUD control apparatus 1500 of FIG. 15 may be implemented as the electronic device 1600.

The electronic device 1600 may include a processor 1610, a memory 1620, a camera 1630, a storage device 1640, an input device 1650, an output device 1660, and a network interface 1670. However, the disclosure is not limited thereto, and as such, according to another example embodiment, the electronic device 1600 may include other components or one or more of the components illustrated in FIG. 16 may be omitted from the electronic device 1600. The processor 1610, the memory 1620, the camera 1630, the storage device 1640, the input device 1650, the output device 1660, and the network interface 1670 may communicate with each other through a communication bus 1680. For example, the electronic device 1600 may be implemented as part of a means of transportation such as a car or an airplane.

The processor 1610 executes instructions or functions to be executed in the electronic device 1600. For example, the processor 1610 may process the instructions stored in the memory 1620 or the storage device 1640. The processor 1610 may perform the operations described through FIGS. 1A to 15.

The memory 1620 stores a variety of data for providing an HUD image. The memory 1620 may include a computer-readable storage medium or a computer-readable storage device. The memory 1620 may store instructions to be executed by the processor 1610 and may store related information while software and/or an application is executed by the electronic device 1600.

The camera 1630 may capture a photo and/or a video. For example, the camera 1630 may capture a user image including a user (for example, the face of the user). In detail, the camera 1630 may include the eye tracking camera 130 of FIG. 1A. The camera 1630 may provide a 3D image including depth information related to objects.

The storage device 1640 includes a computer-readable storage medium or computer-readable storage device. The memory 1640 may store a variety of data for providing an HUD image. The storage device 1640 may store a more quantity of information than the memory 1620 for a long time. For example, the storage device 1640 may include a magnetic hard disk, an optical disk, a flash memory, a floppy disk, or other non-volatile memories known in the art.

The input device 1650 may receive an input from the user in traditional input manners through a keyboard and a mouse, and in new input manners such as a touch input, a voice input, and an image input. For example, the input device 1650 may include a keyboard, a mouse, a touch screen, a microphone, or any other device that detects the input from the user and transmits the detected input to the electronic device 1600.

The output device 1660 may provide an output of the electronic device 1600 to the user through a visual, auditory, or haptic channel. The output device 1660 may include, for example, a display, a touch screen, a speaker, a vibration generator, or any other device that provides the output to the user. In detail, the output device 1660 may include the display device 120 of FIG. 1A. The network interface 1670 may communicate with an external device through a wired or wireless network.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The devices may be configured to act as software modules in order to perform the operations of the above-described examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a head-up display (HUD), the method comprising:
   performing eye tracking of an eye of a user in a captured image;
   identifying an eye tracking status based on a result of the eye tracking;
   selecting a two-dimensional (2D) rendering mode based on the eye tracking status being classified as a first status based on a rate of change of eye coordinates and selecting a three-dimensional (3D) rendering mode based on the eye tracking status being classified as a second status based on the rate of change of the eye coordinates; and
   rendering the HUD image in the selected rendering mode,
   wherein the identifying the eye tracking status comprises classifying the eye tracking status as one of the first status and the second status further based on whether the eye coordinates are present in the result of the eye tracking, and
   wherein the eye tracking status is classified as the first status based on the eye coordinates being included in the result of the eye tracking and the rate of change of the eye coordinates is less than a reference value.

2. The method of claim 1, wherein the reference value corresponds to a system processing rate.

3. The method of claim 1, wherein the eye tracking status is classified as the second status based on the eye coordinates being included in the result of the eye tracking and the rate of change of the eye coordinates is greater than a reference value, or based on the eye coordinates not being included in the result of the eye tracking.

4. The method of claim 1, wherein the HUD image is rendered based on a first source image for a first viewpoint and a second source image for a second viewpoint.

5. The method of claim 4, wherein, based on the selected rendering mode being the 2D rendering, the rendering the HUD image comprises rendering the HUD image by setting the first viewpoint and the second viewpoint equally as a single viewpoint.

6. The method of claim 5, wherein the rendering the HUD image comprises:
   setting, based on the result of the eye tracking including current eye coordinates of both eyes and a rate of change of the current eye coordinates being greater than a reference value, the first viewpoint and the second viewpoint equally as a center viewpoint of the current eye coordinates; and
   setting, based on the result of the eye tracking not including the current eye coordinates, the first viewpoint and the second viewpoint equally as a center viewpoint of previous eye coordinates.

7. The method of claim 4, wherein, based on the selected rendering mode being the 3D rendering mode, the rendering the HUD image comprises rendering the HUD image by setting the first viewpoint and the second viewpoint as different viewpoints.

8. The method of claim 1, wherein based on the rendering mode being selected, the rendering mode is switched from the 3D rendering mode to the 2D rendering mode or from the 2D rendering mode to the 3D rendering mode during a buffer time corresponding to a plurality of frames.

9. The method of claim 8, wherein the HUD image is rendered based on a first source image for a first viewpoint and a second source image for a second viewpoint, and
   wherein, based on the rendering mode being switched from the 2D rendering mode to the 3D rendering mode, the rendering the HUD image comprises rendering the HUD image while gradually changing the first viewpoint and the second viewpoint to a single viewpoint used in the 2D rendering mode over the buffer time.

10. A non-transitory computer-readable storage medium storing instructions that, when executed by a processor, cause the processor to perform the method of claim 1.

11. An apparatus for controlling a head-up display (HUD), the apparatus comprising:
   a memory configured to store one or more instructions; and
   a processor configured to execute the one or more instructions to:
      perform eye tracking of an eye of a user in a captured image, identify an eye tracking status based on a result of the eye tracking, select a two-dimensional (2D) rendering mode based on the eye tracking status being classified as a first status based on a rate of change of eye coordinates and select a three-dimensional (3D) rendering mode based on the eye tracking status being classified as a second status based on the rate of change of the eye coordinates, and render the HUD image in the selected rendering mode, wherein the processor is further configured to classify the eye tracking status as one of the first status and the second status further based on whether the eye coordinates are present in the result of the eye tracking, and wherein the eye tracking status is classified as the first status based on the eye coordinates being included in the result of the eye tracking and the rate of change of the eye coordinates is less than a reference value.

12. The apparatus of claim 11, wherein, based on the rendering mode being selected, the rendering mode is switched from the 3D rendering mode to the 2D rendering mode or from the 2D rendering mode to the 3D rendering mode during a buffer time corresponding to a plurality of frames.

13. A head-up display (HUD) device comprising:

an eye tracking camera configured to capture an image including a user;

a processor configured to:
  perform eye tracking on the captured image,
  identify an eye tracking status based on a result of the eye tracking,
  select a two-dimensional (2D) rendering mode based on the eye tracking status being classified as a first status based on a rate of change of eye coordinates and select a three-dimensional (3D) rendering mode based on the eye tracking status being classified as a second status based on the rate of change of the eye coordinates, and
  render the HUD image in the selected rendering mode; and a display device configured to provide the HUD image to the user using augmented reality (AR), wherein the processor is further configured to classify the eye tracking status as one of the first status and the second status further based on whether the eye coordinates are present in the result of the eye tracking, and wherein the eye tracking status is classified as the first status based on the eye coordinates being included in the result of the eye tracking and the rate of change of the eye coordinates is less than a reference value.

14. The HUD device of claim 13, wherein the processor is further configured to, based on the rendering mode being selected, switch the rendering mode from the 3D rendering mode to the 2D rendering mode or from the 2D rendering mode to the 3D rendering mode during a buffer time corresponding to a plurality of frames.

15. A display apparatus comprising:

a memory configured to store one or more instructions; and a processor configured to execute the one or more instructions to:
  receive eye tracking information on an eye of a user in a captured image;
  determine a rate of change of eye coordinates based on the eye tracking information;
  identify whether the tracking of the eye of the user is stable or unstable based on the rate of change of the eye coordinates;
  output a virtual object in a two-dimensional (2D) image based on the tracking of the eye of the user being unstable; and
  output the virtual object in a three-dimensional (3D) image based on the tracking of the eye of the user being stable, wherein the processor is further configured to classifying the tracking of the eye of the user as one of stable and unstable further based on whether the eye coordinates are present in the eye tracking information, and wherein the tracking of the eye of the user is classified as stable based on the eye coordinates being included in the eye tracking information and the rate of change of the eye coordinates is less than a reference value.

16. A display method comprising:

receiving eye tracking information on an eye of a user in an image;

determining a rate of change of eye coordinates based on the eye tracking information;

identifying whether the tracking of the eye of the user is stable or unstable based on the rate of change of the eye coordinates;

identifying whether the tracking of the eye of the user is stable or unstable based on the rate of change of the eye coordinates;

outputting a virtual object in a two-dimensional (2D) image based on the tracking of the eye of the user being unstable; and outputting the virtual object in a three-dimensional (3D) image based on the tracking of the eye of the user being stable, wherein the identifying whether the tracking of the eye of the user is stable or unstable comprises classifying the tracking of the eye of the user as one of stable and unstable further based on whether the eye coordinates are present in the eye tracking information, and wherein the tracking of the eye of the user is classified as stable based on the eye coordinates being included in the eye tracking information and the rate of change of the eye coordinates is less than a reference value.

* * * * *